(12) United States Patent
Döbler (10) Patent No.: US 6,280,177 B1
(45) Date of Patent: Aug. 28, 2001

(54) INJECTION MOULDING TOOL

(75) Inventor: Walter Döbler, Bad Urach-Seeburg (DE)

(73) Assignee: System Engineering Knauer GmbH & Co. KG, Bad Urach (DE)

( * ) Notice: Subject to any disclaimer, the term of this patent is extended or adjusted under 35 U.S.C. 154(b) by 0 days.

(21) Appl. No.: 09/212,775

(22) Filed: Dec. 16, 1998

(30) Foreign Application Priority Data

Dec. 23, 1997 (DE) ............................................ 197 57 412

(51) Int. Cl.[7] .................................................. B29C 45/23
(52) U.S. Cl. ............................................ 425/564; 425/566
(58) Field of Search .................................. 425/562, 563, 425/564, 565, 566

(56) References Cited

U.S. PATENT DOCUMENTS 4,832,593   5/1989   Brown ................................. 425/564

FOREIGN PATENT DOCUMENTS

| 196 08 676 C1 | 1/1997 | (DE) . |
|---|---|---|
| 0 407 683 A2 | 1/1991 | (EP) . |
| 0 714 748 A1 | 6/1996 | (EP) . |
| 2 641 227 A1 | 7/1990 | (FR) . |
| 02-214632 | 8/1989 | (JP) . |
| 05-318533 | 5/1992 | (JP) . |
| 07-251431 | 2/1995 | (JP) . |
| 10-113955 | 10/1997 | (JP) . |

*Primary Examiner*—Tim Heitbrink
(74) *Attorney, Agent, or Firm*—Seed Intellectual Property Law Group PLLC (57) ABSTRACT

An injection moulding tool comprises a hot-runner manifold plate, at least one nozzle holder resting on said hot-runner manifold plate, a shut-off needle which is movably guided in said nozzle holder, and a piston arranged in a piston chamber and adapted to be actuated by a fluid, said piston being connected to the shut-off needle and moving said shut-off needle to its various positions. The hot-runner manifold plate comprises at least one distributor channel, the nozzle holder comprises at least one supply channel which is associated with the shut-off needle, and said at least one distributor channel is connected to said at least one supply channel. A structural design of this kind is to be simplified and rendered more compact. For this purpose, the piston chamber is integrated in the nozzle holder in such a way that the piston is arranged between the shut-off needle and the hot-runner manifold plate.

20 Claims, 4 Drawing Sheets

INJECTION MOULDING TOOL

CROSS-REFERENCE TO RELATED APPLICATIONS

This application claims priority on German Application No. 197 57 412.2, filed Dec. 23, 1997.

The present invention refers to an injection moulding tool comprising a hot-runner manifold plate, at least one nozzle holder resting on said hot-runner manifold plate, a shut-off needle which is movably guided in said nozzle holder, and a piston arranged in a piston chamber and adapted to be actuated by a fluid, said piston being connected to the shut-off needle and moving said shut-off needle to its various positions, and said hot-runner manifold plate comprising at least one distributor channel, said nozzle holder comprising at least one supply channel which is associated with said shut-off needle, and said at least one distributor channel being connected to said at least one supply channel.

BACKGROUND OF THE INVENTION

An injection moulding tool of this type is known e.g. from U.S. Pat. No. 5,533,882. In this device, a nozzle holder rests directly on the hot-runner manifold plate, a distributor channel being directly connected to a supply channel in the nozzle holder. The nozzle is arranged at the nozzle holder end facing away from the hot-runner manifold plate. The supply channel merges at this point with the nozzle opening, said nozzle opening being adapted to be opened and closed by a valve stem. The valve stem is supported in the nozzle holder such that it is axially displaceable therein. The movement of the valve stem is produced by a sleevelike piston which is coaxially arranged around the nozzle holder. The piston chamber is defined by a sleeve surrounding the nozzle holder and by a closure plate. In order to establish a connection between the valve stem and the piston, a comparatively complicated yoke structure has to be used for connecting said needle and said piston through a lateral opening. It is true that this kind of structural design already provides a valve-stem closure means on the side of the cavity, but this closure means is comparatively complicated as far as its structural design is concerned so that improvements are desirable.

In the case of nozzle holders resting on the hot-runner manifold plate, needle closure means including a shut-off needle which extends through the hot-runner manifold plate have normally always been used up to now. The piston used for controlling the shut-off needle was then provided in a separate means at the back of the hot-runner manifold plate. However, such a structural design always necessitated a comparatively long shut-off needle, and this rendered the structural design comparatively complicated and expensive. A structural design of this type is known e.g. from EP 0647514A1.

In the case of another structural design, the hot-runner manifold plate has been subdivided into a main hot-runner manifold plate and into cooler individual plates. Although the piston units could-there be accommodated in the cooler individual plates, a connection channel which could be heated less strongly was necessary between the main hot-runner manifold plate and the nozzle holder resting on the individual plate. Also this structural design is comparatively complicated and expensive, since additional components are required. Furthermore, temperature control problems may arise in the case of this kind of embodiment. Such a device is known e.g. from EP0374353A2.

SUMMARY OF THE INVENTION

It is therefore the object of the present invention to provide an injection moulding tool of the type mentioned at the start, which has a compact and economy-priced structural design.

According to the present invention, this object is achieved by the features that the piston chamber is integrated in the nozzle holder in such a way that the piston is arranged between the shut-off needle and the hot-runner manifold plate.

Hence, the great advantage of the present invention is to be seen in the measures of implementing the piston as a movable component of the nozzle holder and arranging it directly in the hot area. Apparently, a prejudice against arranging the piston in the direct vicinity of the hot-runner manifold plate has hitherto existed in the prior art. On the basis of the present solution, it is possible to use extremely short shut-off needle lengths. In addition, the structural designs of the shut-off needle and of the piston are less complicated than in the case of known needle closure means located on the side of the cavity. This also results in a substantial advantage with regard to the assembly and disassembly of the injection moulding tool according to the present invention, since a disassembly operation can be carried out from the outer side towards the inner side, without direct access to the hot-runner manifold plate. The present solution also provides a structural design which requires a much smaller number of components than prior art designs. Last but not least, the overall height of the whole tool and the entire amount of space required are essentially reduced. The nozzle holder can easily be a multi-part component and rest on the hot-runner manifold plate via intermediate connecting pieces.

In the case of one embodiment, an essential simplification of the assembly and disassembly of the injection moulding tool is given on the basis of the features that the nozzle holder has a rear area with which it rests on the hot-runner manifold plate, that the piston chamber is open at said rear area of the nozzle holder, and that the piston chamber is closed by the hot-runner manifold plate at said rear area. Insertion and removal of the piston including the needle can therefore be carried out from the back of the nozzle holder. It is not necessary to provide an additional closure means, since one wall of the piston chamber is defined by the surface of the hot-runner manifold plate.

A further improvement of the compactness of the whole device can be achieved in that the at least one supply channel extends through the piston chamber and the piston, said piston being provided with at least one corresponding opening. Hence, it is not necessary to enlarge the cross-section of the nozzle holder for transferring the liquid plastic material from the distributor channel to the supply channel. The measure of positioning the at least one supply channel such that it extends directly through the piston chamber has not been known in the prior art up to now.

A preferred embodiment can be so conceived that, displaced relative to the shut-off needle, at least one thick-walled connection piece projects into the piston chamber, said connection piece being connected to the nozzle holder and projecting into the piston chamber substantially parallel to the axis of said shut-off needle, that the supply channel extends through the connection piece, and that the connection piece has an end face through which it communicates with the hot-runner manifold plate in such a way that the supply channel is connected to a distributor channel. In view of the fact that the connection pieces are directly placed on the hot-runner manifold plate, the at least one supply channel is sufficiently heated as well. Due to the thick-walled nature of the connection piece, this heat is also sufficiently maintained and the fluid flowing into the piston chamber has only an insignificant influence in this respect. It is, however, also possible to preheat the fluid in a suitable manner.

In addition, the connection piece can also serve as a piston guide means. For this purpose, the at least one corresponding opening in the piston is adapted to the outer contour of the connection piece in positive engagement therewith in such a way that the piston slides on said connection piece. A positive adaptation is also necessary to prevent a leakage flow of fluid from one side of the piston to the other. The openings in the piston can also be provided with suitable sealing rings sliding along the outer contour of the connection piece.

In order to achieve for most cases of use an arrangement in which the heat radiated from the hot-runner manifold plate has the least possible influence on the fluid and the interior of the piston chamber, the present invention can also be so conceived that a high-temperature-resistant insulating disk is arranged between the hot-runner manifold plate and the piston chamber, said insulating disk consisting preferably of a high-temperature-resistant plastic material and covering the surface of the hot-runner manifold plate towards the piston chamber. This will have the effect that the temperature in the interior of the piston chamber will be reduced strongly and the function of the fluid-operated piston unit will be improved.

In accordance with an advantageous embodiment, the outer circumferential surface of the insulating disk can be received in a step formed in the nozzle holder such that said insulating disk is flush with said nozzle holder, and the insulating disk can be provided with at least one precisely dimensioned opening for the at least one connection piece. The whole cross-section of the piston chamber is thus covered relative to the hot-runner manifold plate. In addition, the insulating disk can also fulfil a sealing function.

According to one embodiment, polyimide, which is, at 2 MPa, preferably dimensionally stable up to approx. 360° C., proved to be a preferred material for the insulating disk. Such a material resists the comparatively high temperatures at the hot-runner manifold plate without any reduction of the insulating and sealing effect.

In order to permit precise positioning of the insulating disk also in the axial direction, the circumference of the end face area of the at least one connection piece can be reduced in size and this reduced circumferential area can be implemented as a mounting projection for precise insertion in the at least one opening of the insulating disk, said mounting projection defining relative to the rest of the connection piece a stop edge for the insulating disk. The insulating disk must be adapted to be attached to the connection piece to such an extent that the end face of the connection piece comes into contact with the hot-runner manifold plate. Preferably, an insulating disk having a thickness of approx. 2 mm can be provided, so that the mounting projection must have a corresponding length.

The compactness is increased still further in the case of an embodiment where the piston has a front and a back, and where the nozzle holder has fluid channels arranged therein, at least one fluid channel opening into the piston chamber in such a way that it is associated with the back of the piston, and at least one fluid channel opening into the piston chamber in such a way that it is associated with the front of the piston. This provides the possibility of reciprocating the piston in the piston chamber by applying a suitable pressure to associated fluid channels.

In accordance with an advantageous embodiment, the fluid connection can be arranged on the nozzle holder in spaced relationship with the hot-runner manifold plate, and the at least one fluid channel, which is associated with the back of the piston, can extend through the connection piece. Hence, the fluid will always be conducted in spaced relationship with the hot-runner manifold plate so that this hot-runner manifold plate has the least possible influence on the fluid. The direction of supply of the fluid in the interior of the nozzle holder is opposite to the direction of flow of the plastic material, whereby the distance between the fluid and the hot point is as large as possible.

In order to permit the fluid channel associated with the connection piece to introduce the fluid into the piston chamber without any interfering influences, the present invention is additionally so conceived that the at least one fluid channel associated with the back of the piston opens into the piston chamber in the area of the stop edge for the insulating disk, said stop edge having in this area an undercut portion so that the fluid can flow out or flow in without being hindered by the insulating disk. Hence, the undercut portion guarantees that there is a distance at least between the area of the discharge end of the fluid channel and the insulating disk. This measure also guarantees a very compact structural design of the whole tool.

Since the piston works in comparatively hot surroundings, it will be advantageous to implement it as a cylindrical pneumatic piston. Air is much easier to handle in comparatively hot surroundings.

In order to improve the functional performance of the piston and in order to minimize wear, the piston can be provided with at least one heat-resistant piston ring on the outer circumference thereof, said piston ring being in contact with the sliding surface of the piston chamber. Such piston rings are known very well in the prior art and are also suitable for use in hot surroundings. Leakage flow between the front and the back of the piston is prevented by a suitable piston ring also at higher temperatures.

In order to guarantee a reliable start of the piston even from extreme positions, the front and the back of the piston can each be provided with recessed portions which are arranged in such a way that the fluid channels open into the piston chamber in the area of said recessed portions. This has the effect that in the opening area a hollow space will always be formed at the piston even if the front or the back of the piston abuts on the respective end face of the piston chamber. A sufficient force for starting the piston can therefore easily be applied.

The present invention additionally refers to an embodiment for which protection is also separately claimed. This embodiment is characterized in that the piston consists of two interconnected piston disks and that the shut-off needle is provided with a fastening head at the end associated with the piston, said fastening head abutting on a back of the first piston disk and being arrested through a front of the second piston disk in a recess arranged in the interior of the piston and delimited by the back of the first piston disk and the front of the second piston disk. Up to now, it has always been problematic to a certain extent to anchor the shut-off needle, which normally has a small diameter, in the piston. Due to the small diameter, screw-fastening of the shut-off needle has been comparativley problematic. By means of the present invention, a positive engagement is now achieved by a two-part piston. Two axially abutting piston disks form in the interior thereof a recess in which a fastening head of the shut-off needle is arrested. However, even the disassembly and the assembly of the piston and of the shut-off needle will be comparatively simple, since the shut-off needle will be arrested automatically when the two piston disks are joined. Inadvertent loosening, which could not be excluded in the case of threaded joints, is impossible. In addition, the fastening head can have a very small size so that the production of the shut-off needle will only entail minor losses of material.

In accordance with an advantageous embodiment, the fastening head can have a not rotationally symmetric cross-section and the first piston disk can be provided with a central through-hole with a cross-sectional configuration of such a nature that, after having been rotated about the axis of the shut-off needle, the fastening head is adapted to be passed through said opening at a predetermined rotational angle position. Hence, it is not necessary that the whole shut-off needle can be passed through the opening, and, consequently, the assembly operation can be carried out from the front of the first piston disk. Only the fastening head must be introduced in the opening and rotated subsequently so that it will then no longer be possible to remove the shut-off needle. The second piston disk then guarantees that the head will be arrested at the desired position.

For this purpose, the front of the second piston disk can preferably have arranged therein the recess whose cross-sectional configuration is of such a nature that, after having been rotated about the axis of the shut-off needle, the fastening head is adapted to be inserted into the recess at another predetermined rotational angle position, the fastening head abutting on the back of the first piston disk when it occupies said other rotational angle position. The first and the second piston disks can assume accurate positions relative to one another via a suitable means, which may e.g. consist of pins. The opening and the recess are located at suitable angular positions relative to one another. The shut-off needle is mounted by inserting the fastening head into the opening at a specific angular position, rotating the shut-off needle and attaching the second piston disk in such a way that the fastening head will be introduced in the recess. The shut-off needle is then reliably held on the two-part piston.

An extremely advantageous embodiment is so conceived that the fastening head is implemented as a hammer head comprising a rotationally symmetric shank portion having a length corresponding substantially to the thickness of the first piston disk, and a diameter corresponding substantially to the width of the opening which is provided in the first piston disk and which is implemented as an elongated hole, and further comprising a hammer portion having a length, which exceeds the width of the opening in the first piston disk, and a width, which is smaller than the width of the opening in the first piston disk, the recess in the front of the second piston disk having a width which permits the hammer portion to be inserted in a precisely fitting manner. Hence, the recess guarantees that the shut-off needle is arrested such that it is secured against rotation. Due to the fact that the opening in the first piston disk has a width which corresponds to the diameter of the rotationally symmetric shank portion, the hammer portion can, in cases in which the shank portion has a diameter which is smaller than that of an adjoining area of the shut-off needle, be provided with a length corresponding to the diameter of the adjoining area of the shut-off needle. This permits the realization of very small dimensions of the fastening head.

In order to achieve the largest possible cross-section of the connection piece, it proved to be advantageous when the at least one connection piece and the at least one opening in the piston have a substantially kidney-shaped cross-section. This kidney-shaped cross-section can then be positioned such that it is located comparatively close to the opening for the shut-off needle in the nozzle holder.

For introducing the largest possible amounts of plastic material into the nozzle holder, two connection pieces can be provided on the nozzle holder, said connection pieces being arranged symmetrically with regard to the shut-off needle which is disposed centrally on the piston, and two openings can be provided in the piston, each connection piece being provided with a supply channel and/or a fluid channel. This also provides symmetrical heat transfer, whereby undesired or unfavourable heat distributions are avoided. This kind of arrangement offers, however, also the possibility of conducting two different plastic materials through the nozzle holder. The nozzle holder has then different distributor channels associated therewith.

DESCRIPTION OF THE DRAWINGS

In the following, an embodiment of the present invention will be explained in detail making reference to a drawing, in which.

DETAILED DESCRIPTION OF THE ILLUSTRATED EMBODIMENTS

Figure 1:
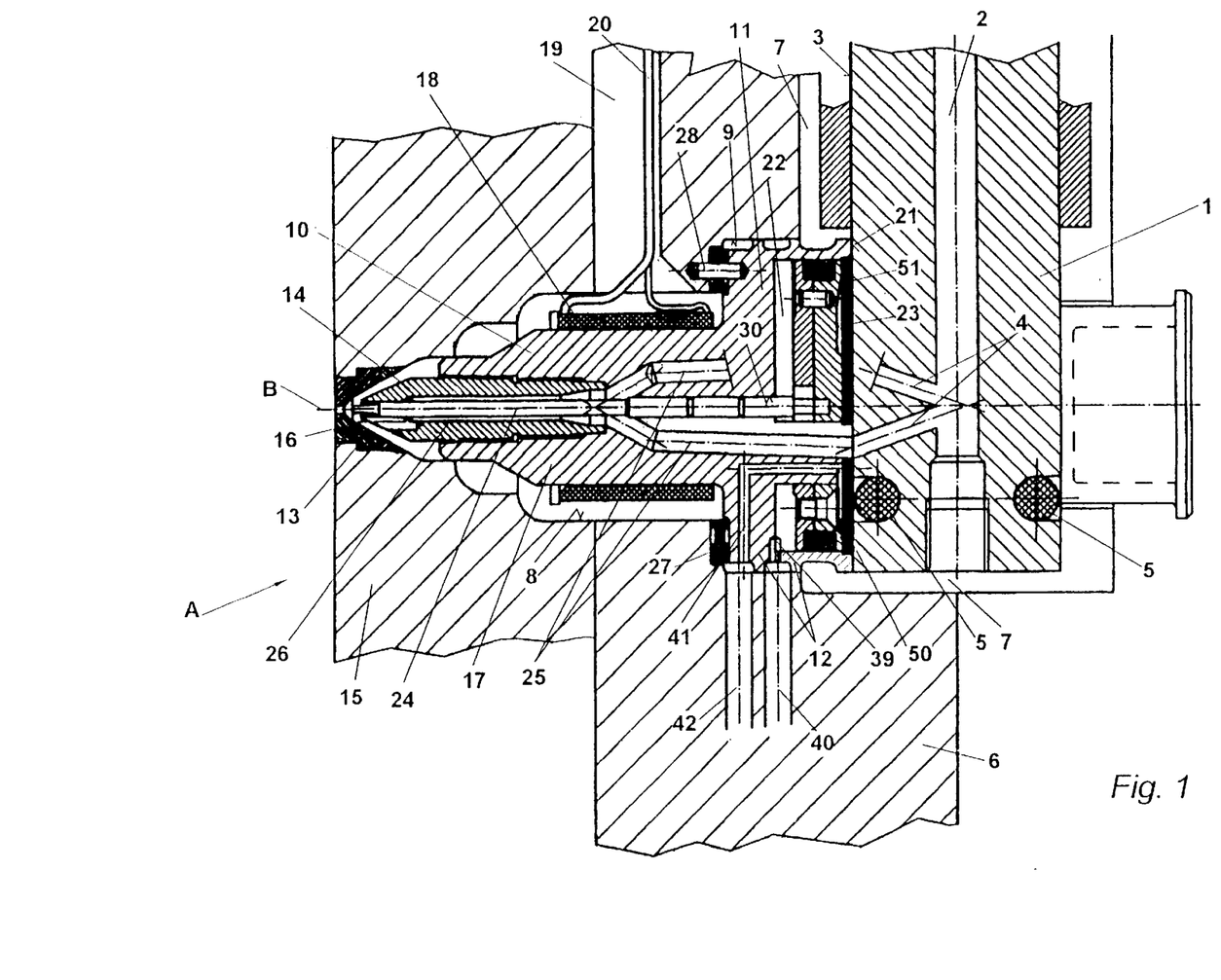
FIG. 1 shows an injection moulding tool in a sectional side view.

The injection moulding tool comprises a hot-runner manifold plate 1 comprising a main hot runner 2 and distributor channels 4 which branch off from the hot runner 2 and which are open towards the lateral surface 3. The hot-runner manifold plate 1 is provided with embedded heating elements 5 which take care that the plate 1 is suitably heated. At least on the side A of the cavities, the hot-runner manifold plate 1 is surrounded by a channel beam plate 6 which is arranged in spaced relationship with said hot-runner manifold plate 1 so that an air gap 7 is formed between these two components.

The channel beam plate 6 is provided with a cylindrical bore 8 associated with the distributor channels 4 and provided with a bore step 9. The bore 8 and the bore step 9 have inserted therein from the rear a suitably adapted nozzle holder 10. The nozzle holder 10 is provided with a cylindrical shoulder 11 which is adapted to the bore step 9 and which is provided with ribs 12 on the outer periphery thereof, said ribs 12 being in contact with the inner surface of the bore step 9. The circumferentially extending annular ribs 12 take care that only a small amount of heat is transferred from the nozzle holder 10 to the channel beam plate 6. A nozzle tip 14 is screwed into the front 13 of the nozzle holder 10 so that said nozzle tip can easily be replaced in the case of wear. The area of the nozzle holder 10 associated with the front 13 is held in a base member 15 provided with an discharge mouthpiece 16 associated with the nozzle tip 14. An annular heating element 18 pushed onto the cylindrical central area 17 of the nozzle holder provides the temperature required. An opening 19 in the channel beam plate 6 serves as a lead-through means for the connecting leads 20 used for the annular heating element.

Prior to giving a detailed description of the structural design of the nozzle holder 10 and of the built-in components arranged therein, it should be noted that a plurality of nozzle holders 10 can be associated with the hot-runner manifold plate 1. It is also possible to arrange two respective nozzle holders 10 back to back in series, said nozzle holders 10 being then only separated by the hot-runner manifold plate 1.

The nozzle holder 10 is arranged such that its back 21 rests on the lateral surface 3 of the hot-runner manifold plate 1. The cylindrical shoulder 11 has formed therein a cylindrical piston chamber 22 which is open towards the back 21. The piston chamber 22 contains an axially movable piston 23 having a shut-off needle 24 centrally arranged thereon, said shut-off needle being displaceably supported in the nozzle holder 10 and extending into the nozzle tip 14 or up to and into the discharge mouthpiece 16. The shut-off needle 24 has a circular cross-section and it is arranged coaxially with the nozzle holder 10 and the nozzle tip 14 as well as the piston 23.

The nozzle holder 10 is provided with two supply channels 25 extending alongside the shut-off needle 24 and merging in the area of the nozzle tip 14; from the merging point onwards, they define a common supply channel 26. The supply channels 25 extend up to the back 21 of the nozzle holder 10 through the piston chamber 22 in such a way that they are in alignment with and communicate with the associated distributor channels 4.

The nozzle holder 10 axially abuts on the channel beam plate 6 via an axial sealing means 27 and is positioned via pins 28 at its rotational angle position. The nozzle holder 10 is firmly pressed onto the hot-runner manifold plate 1 by this connection in combination with the channel beam plate 6.

Figure 2:
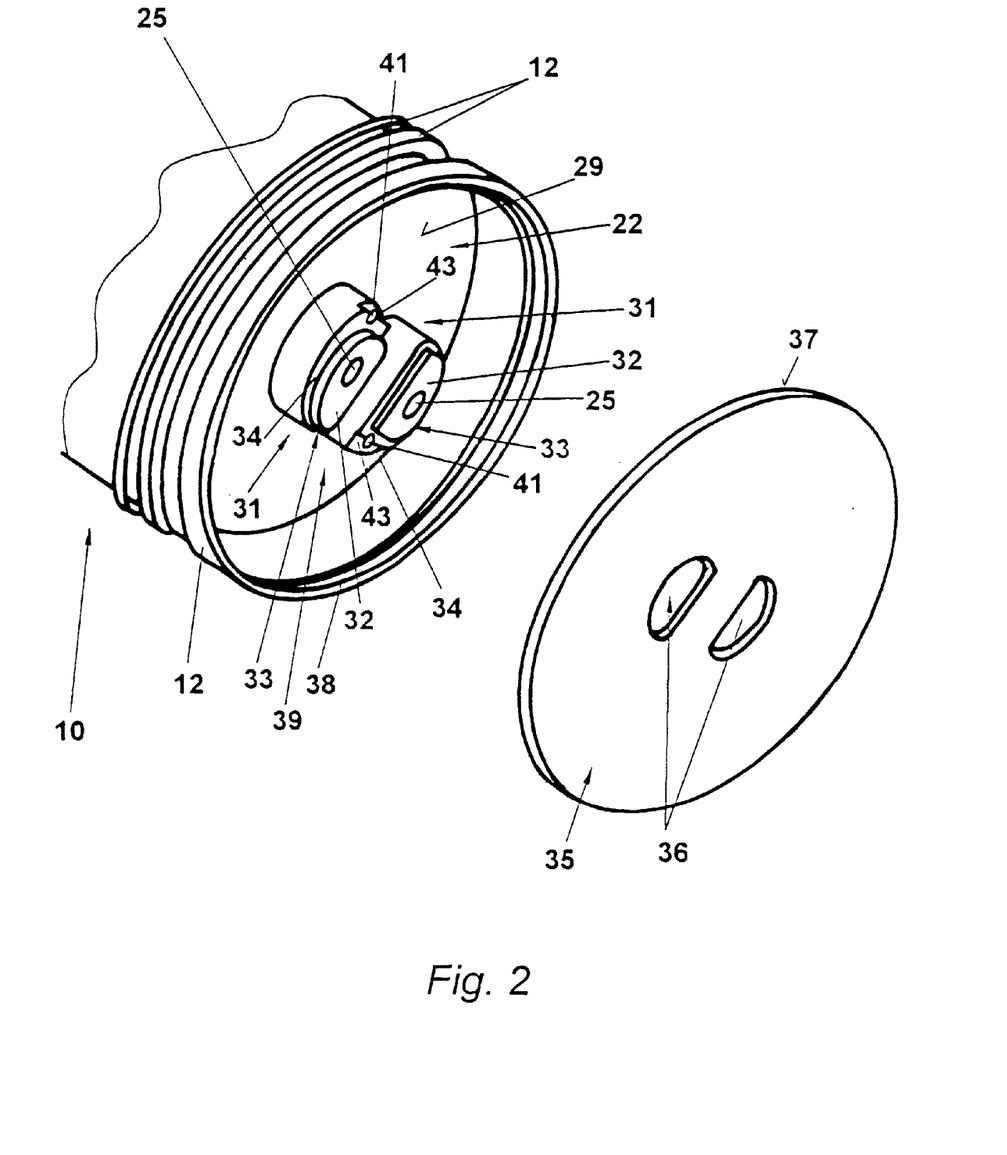
FIG. 2 shows a back of the nozzle holder of FIG. 1 in a perspective exploded view.

On the basis of FIG. 2, the structural design of the piston chamber 22 will now be explained in detail. The piston chamber 22 is substantially cylindrical and has at the centre of its bottom side 29 a needle guide opening 30 used for inserting therein the shut-off needle 24. On the left- and on the right-hand side of the needle guide opening 30, two kidney-shaped connection pieces 31 project from the bottom side 29; said connection pieces 31 are located adjacent the needle guide opening 30 and their respective end faces 32 press against the hot-runner manifold plate 1. Hence, the connection pieces 31 have a height which corresponds to the depth of the piston chamber 22. A respective supply channel 25 extends at the centre of said connection pieces 31; when the nozzle holder 10 has been mounted, said supply channel 25 communicates with a respective distributor channel 4. The free end portion of each of the connection pieces 31 is reduced in diameter so that a mounting projection 33 is formed, said mounting projection 33 being approximately kidney-shaped as well. The mounting projection height, which is defined by the stop surface 34, corresponds approximately to the thickness of a circular insulating disk 35 consisting of a high-temperature-resistant plastic material, preferably a polyimide. The insulating disk 35 is provided with two corresponding kidney-shaped openings 36 which are adapted to be accurately fitted onto the mounting projections 33. The outer circumferential surface 37 of the insulating disk 35 is inserted, with a slight press fit, in a clamping step 38 at the end of the opening of the piston chamber 22. The insulating disk 35 thus produces a cover for the piston chamber 22 so that the hot lateral surface 3 of the hot-runner manifold plate 1 is not directly connected to the interior of the piston chamber 22. At 2 MPa, this high-temperature-resistant insulating disk 35 is dimensionally stable up to approx. 360° C. In addition to the insulating effect with regard to the hot-runner manifold plate 1, said insulating disk also fulfills a sealing function. Hence, it is also tightly fitted to the mounting projections 33.

The bottom side 29 of the piston chamber 22 has associated therewith an air channel 39 which opens into the piston chamber 22 at this location. The air channel 39 communicates with an air connection channel 40 in the channel beam plate 6. For this purpose, the air channel 39 ends at the lateral surface of the nozzle holder 10 between two ribs 12 and merges with the air connection channel 40. Preferably, two of these first air channels 39 are arranged in the nozzle holder 10 in diametrically opposed relationship with each other. A second air channel 41 also ends at the lateral surface of the nozzle holder 10 on the other side of a rib 12 and displaced relative to said first air channel 39, said second air channel 41 communicating with a second air connection channel 42 in the channel beam plate 6. The second air channel 41 first extends in parallel with the first air channel 39 radially into the nozzle holder 10 and then branches off in the axial direction whereupon it continues within the connection piece 31. It can be seen that also two second air channels 41 are provided, each connection piece 31 having associated therewith one of these second air channels 41. To prevent the outlet openings of the second air channels 41 from being closed by the insulating disk 35, the connection piece 31 has an undercut step 43 in the area of the stop surface 34 so that the air can flow out freely.

Figure 3:
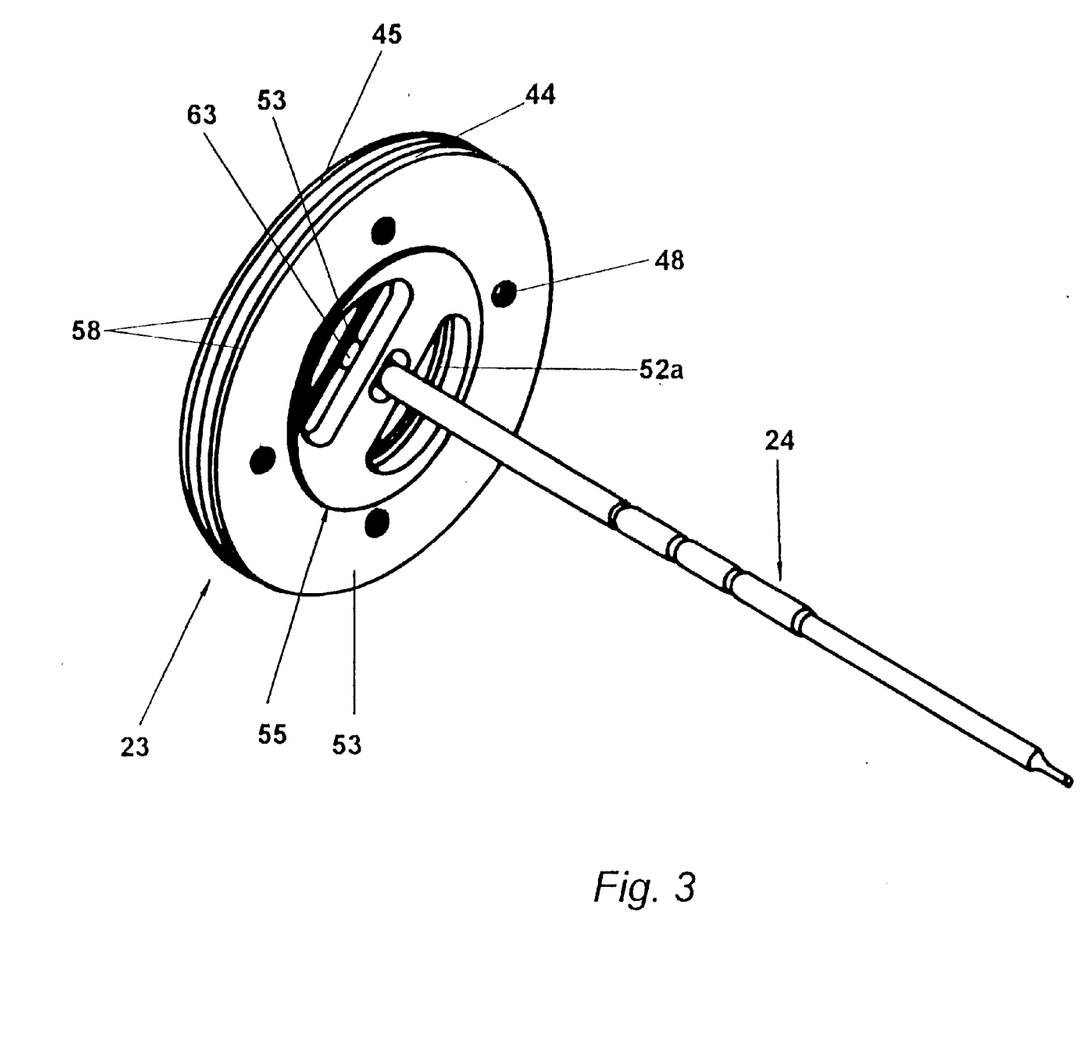
FIG. 3 shows the piston and the shut-off needle of FIG. 1 in a perspective view.

The above-described piston chamber 22 contains the piston 23 shown in FIG. 3. With the aid of FIG. 4–10, the structural design of the piston and its connection to the shut-off needle 24 are now described in detail.

The piston 23 is composed of two parts and consists of a first cylindrical piston disk 44 and of a second cylindrical piston disk 45. The two piston disks 44, 45 are axially joined so that the back 46 of the first piston disk 44 and the front 47 of the second piston disk 45 abut on one another. Fastening is effected by means of tapped holes 48 in the first piston disk 44, countersink-type holes 49 in the second piston disk 45 and countersunk screws 50 and pins 51, which guarantee a precise angular position of the two piston disks relative to one another. Each of the two piston disks 44, 45 is provided with kidney-shaped openings 52, which are adapted to the outer contour of the connection pieces 31, so that the piston 23 can be axially displaced on said connection pieces 31. In the second piston disk 45, a sealing ring 52a is provided in the opening 52, said sealing ring being formed on the inner surface of said opening 52 in a suitable manner and being used for the purpose of preventing a leakage flow of air from the front 53 of the piston 23 to the back 54 of said piston 23. The front 53 and the back 54 each include respective undercut portions 55 so that a free space will always remain when the piston 23 moves to its end positions, i.e. when it is in contact with the bottom side 29 or the insulating disk 35. The undercut portions 55 are chosen such that the air channels 39 and 41 end in this area so that a force can be generated that suffices to start the piston 23. When combined, the two piston disks 44, 45 define a circumferentially extending annular groove 56 having arranged therein two piston rings 58 which are supported by respective O-rings 57 and which slide along the cylindrical inner surface of the piston chamber 22. The piston rings 58 reduce the wear and prevent a leakge flow and they must be heat-resistant for the intended use.

Figure 4:
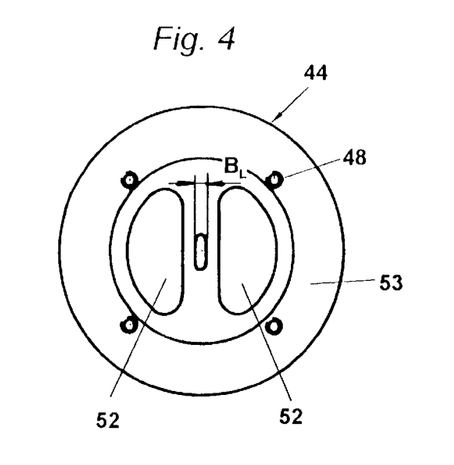
FIG. 4 shows a front of a first piston disk of the piston of FIG. 3.
Figure 5:
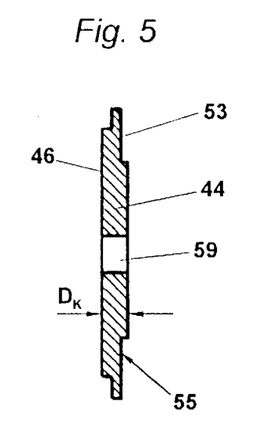
FIG. 5 shows a the piston disk of FIG. 4 in a sectional side view.
Figure 6:
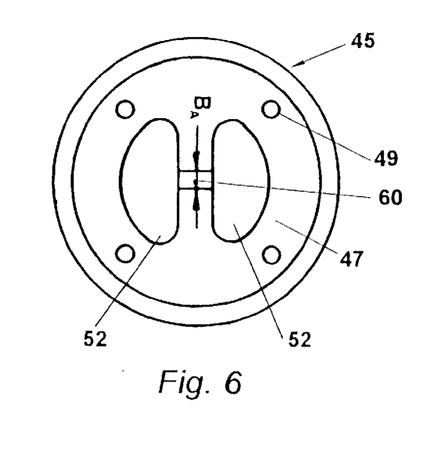
FIG. 6 shows a front of the second piston disk of the piston of FIG. 3.
Figure 7:
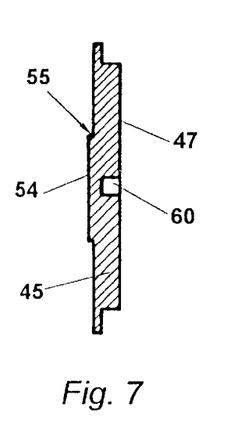
FIG. 7 shows the second piston disk of FIG. 6 in a sectional side view.

The first piston disk 54 has at the centre thereof an elongated hole 59 which extends parallel to the longitudinal direction of the kidney-shaped openings 52. The second piston disk 45 is provided with a longitudinal recess 60 which extends at right angles to the elongated hole 59.

Figures 8, 9, 10:
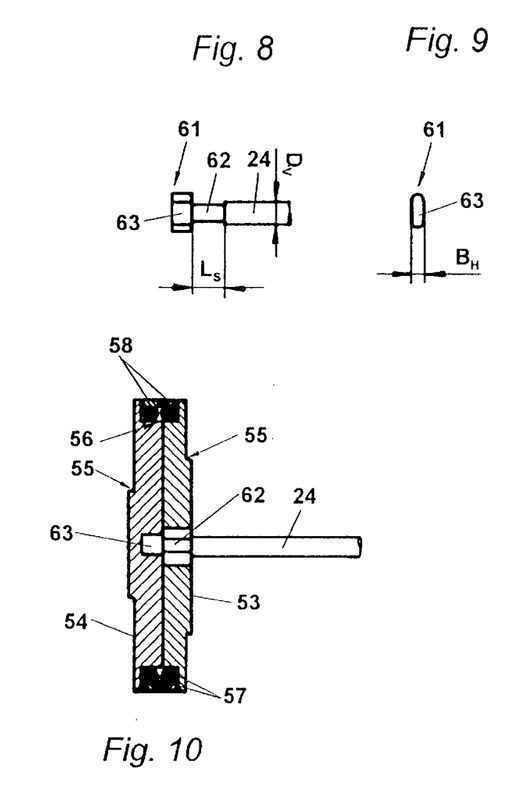
FIG. 8 shows a fastening head of the shut-off needle in a side view.
FIG. 9 shows a fastening head of FIG. 8 in a front view and FIG. 10 shows a side view of the piston having the shut-off needle attached thereto, part of said side view being a sectional view.

The shut-off needle 24 has at its fastening end a fastening head 61 comprising a cylindrical shank portion 62 and a hammer portion 63. The cylindrical shank portion 62 has an axial length $L_s$ which is equal to or slightly larger than the thickness $D_k$ of the piston disk 44 and the length of the elongated hole 59, respectively. The hammer portion 63, whose length exceeds the width $B_H$, is adapted to be passed through the elongated hole 59 at a specific angular position. In order to permit this, the width $B_L$ of the elongated hole 59 is equal to or slightly larger than the width $B_H$ of the hammer portion 63. When the hammer portion 63 of the shut-off needle 24 is introduced in the first piston disk 44, said hammer portion 63 can be inserted until the shank portion 62 has been fully introduced in the elongated hole 59. The subsequent diameter $D_V$ of the shut-off needle is larger than the width $B_L$ of the elongated hole 59 so that said diameter $D_V$ serves as a stop means. When the shut-off needle 24 is then rotated, this will have the effect that the hammer portion 63 engages behind the first piston disk 44. Following this, the second piston disk 45 is attached and secured in position, while inserting the O-rings and the piston rings 58 between the two piston disks; the hammer portion 63 occupies an angular position of such a nature that it can be inserted into the recess 60 in a substantially precisely fitting manner. For this purpose, the recess 60 has a width $B_A$ which is slightly larger than the width $B_H$ of the hammer portion 63. When the two piston disks 44 and 45 have been screwed together, the shut-off needle 24 is reliably secured to the piston 23. By providing a suitable amount of play at the connection point, the shut-off needle 24 will remain easily movable so that alignment errors can be compensated for.

In the following, the mode of operation of the above-described embodiment will be explained in detail.

Liquid plastic material flows through the hot-runner manifold plate 1 in the hot runner 2 and spreads in the distributor channels 4. These distributor channels 4 directly communicate with the supply channels 25 via the connection pieces 31. The plastic material flows through the piston chamber 22 into the central area 17 of the nozzle holder 10 and there it is advanced through a common supply channel 26 into the nozzle tip 14. Depending on the position of the shut-off needle 24, the plastic material can then flow through the discharge mouthpiece 16 into the cavity or cavities. In FIG. 1, the open position of the shut-off needle 24 is shown. At this position, the piston 23 abuts on the insulating disk 35 and air flows via the connection channel 40 and the air channel 39 into the piston chamber 22 so that pressure is applied to the front 53 of the piston 23.

When the injection moulding tool is to be closed by moving the needle 24 into the discharge mouthpiece 16, the air connection channel 42 has pressure applied thereto and the air connection channel 40 is made pressureless. Pressurized air flowing through the air channel 41 and the connection pieces 31 arrives at the back 54 of the piston 23, whereby said piston will be moved to the left (cf. FIG. 1). The insulating disk 35 guarantees that the piston chamber 22 is shielded to a very large extent and that the heat has the least possible influence on the pressurized air and on the function of the piston 23.

A decisive adavantage of this arrangement is to be seen in the compactness and in the fact that the piston 23 is accommodated in the nozzle holder 10. The plastic melt is transferred to the nozzle holder 10 through openings 52 in the piston itself. This structural design is comparatively simple and can be assembled and disassembled within a very short period of time. By removing the channel beam plate 6, direct free access to the piston unit is automatically gained; in the prior art, this has hitherto only been possible by further disassembly steps. The overall height and the thickness of the whole tool is therefore substantially reduced. Similar to FIG. 1, it is also possible to provide a symmetrical arrangement so that a corresponding channel beam plate 6 with a nozzle holder 10 can also be arranged on the other side of the hot-runner manifold plate 1. The provision of suitable supply channels 4 in the hot-runner manifold plate 1 is then very simple. It is also possible to use the two connection pieces 31 for supplying different plastic constituents.

What is claimed is:

1. An injection moulding tool comprising a hot-runner manifold plate, at least one nozzle holder resting on said hot-runner manifold plate, a shut-off needle which is movably guided in said nozzle holder, and a piston arranged in a piston chamber and adapted to be actuated by a fluid, said piston being connected to the shut-off needle and moving said shut-off needle to its various positions, and said hot-runner manifold plate comprising at least one distributor channel, said nozzle holder comprising at least one supply channel which is associated with said shut-off needle, and said at least one distributor channel being connected to said at least one supply channel, the piston chamber being integrated in the nozzle holder in such a way that the piston is arranged between the shut-off needle and the hot-runner manifold plate, the nozzle holder having a rear area with which it rests on the hot-runner manifold plate, the piston chamber being open at said rear area of the nozzle holder, and the piston chamber being essentially closed by the hot-runner manifold plate at said rear area.

2. An injection moulding tool according to claim 1 wherein the at least one supply channel extends through the piston chamber and the piston, said piston being provided with at least one corresponding opening.

3. An injection moulding tool according to claim 1 wherein, displaced relative to the shut-off needle, at least one thick-walled connection piece projects into the piston chamber, said connection piece being connected to the nozzle holder and projecting into the piston chamber substantially parallel to the axis of said shut-off needle, the supply channel extending through the connection piece, and the connection piece having an end face through which it communicates with the hot-runner manifold plate in such a way that the supply channel is connected to the distributor channel.

4. An injection moulding tool according to claim 2 wherein the at least one corresponding opening in the piston is adapted to the outer contour of the connection piece in positive engagement therewith in such a way that the piston slides on said connection piece.

5. An injection moulding tool according to claim 1 wherein a high-temperature-resistant insulating disk is arranged between the hot-runner manifold plate and the piston chamber, said insulating disk consisting preferably of a high-temperature-resistant plastic material and covering the surface of the hot-runner manifold plate towards the piston chamber.

6. An injection moulding tool according to claim 5 wherein an outer circumferential surface of the insulating disk is received in a step formed in the nozzle holder, and said insulating disk is provided with at least one precisely dimensioned opening for the at least one connection piece.

7. An injection moulding tool according to claim 5 wherein the insulating disk comprises a polyimide, which, at 2 MPa, is preferably dimensionally stable up to approximately 360° C.

8. An injection moulding tool according to claim 3 wherein a circumference of the end face area of the at least one connection piece is reduced in size and the reduced circumferential area is implemented as a mounting projection for precise insertion in the at least one opening of the insulating disk, said mounting projection defining relative to the rest of the connection piece a stop edge for the insulating disk.

9. An injection moulding tool according to claim 1 wherein the piston has a front and a back, and the nozzle holder has fluid channels arranged therein, at least one fluid channel opening into the piston chamber in such a way that it is associated with the back of the piston, and at least one fluid channel opening into the piston chamber in such a way that it is associated with the front of the piston.

10. An injection moulding tool according to claim 1, further comprising a fluid connection arranged on the nozzle holder in spaced relationship with the hot-runner manifold plate and the at least one fluid channel associated with the back of the piston extends through the connection piece.

11. An injection moulding tool according to claim 10 wherein the at least one fluid channel associated with the back of the piston opens into the piston chamber in the area of the stop edge for the insulating disk, said stop edge having in this area an undercut portion so that the fluid can flow out or flow in without being hindered by the insulating disk.

12. An injection moulding tool according to claim 1 wherein the piston is a cylindrical pneumatic piston.

13. An injection moulding tool according to claim 1 wherein the piston is provided with at least one heat-resistant piston ring on the outer circumference thereof, said piston ring being in contact with the sliding surface of the piston chamber.

14. An injection moulding tool according to claim 9 wherein the front and the back of the piston are each provided with recessed portions which are arranged in such a way that the fluid channels open into the piston chamber in the area of said recessed portions.

15. An injection moulding tool according to claim 1 wherein the piston consists of two interconnected piston disks and the shut-off needle is provided with a fastening head at the end associated with the piston, said fastening head abutting on a back of the first piston disk and being arrested through a front of the second piston disk in a recess arranged in the interior of the piston and delimited by the back of the first piston disk and the front of the second piston disk.

16. An injection moulding tool according to claim 15 wherein a cross-section of the fastening head is not rotationally symmetric and the first piston disk is provided with a central through-hole with a cross-sectional configuration of such a nature that, after having been rotated about an axis of the shut-off needle, the fastening head is adapted to be passed through said opening at a predetermined rotational angle position.

17. An injection moulding tool according to claim 15 wherein the front of the second piston disk has arranged therein the recess whose cross-sectional configuration is of such a nature that, after having been rotated about the axis of the shut-off needle, the fastening head is adapted to be inserted into the recess at another predetermined rotational angle position, said fastening head abutting on the back of the first piston disk when it occupies said other predetermined rotational angle position.

18. An injection moulding tool according to claim 15 wherein the fastening head is implemented as a hammer head comprising a rotationally symmetric shank portion having a shank length corresponding substantially to a thickness of the first piston disk, and a diameter corresponding substantially to a first width of the opening which is provided in the first piston disk and which is implemented as an elongated hole, and further comprising a hammer portion having a hammer length, which exceeds the first width of the opening in the first piston disk, and a second width, which is smaller than the first width of the opening in the first piston disk, the recess in the front of the second piston disk having a third width which permits the hammer portion to be inserted in a precisely fitting manner.

19. An injection moulding tool according to claim 3 wherein the at least one connection piece and a complementary opening in the piston have a substantially kidney-shaped cross-section.

20. An injection moulding tool according to claim 1, further comprising two connection pieces arranged on the nozzle holder, said connection pieces being arranged symmetrically with regard to the shut-off needle which is disposed centrally on the piston, and the two openings being provided in the piston, each connection piece being provided with a supply channel and/or a fluid channel.

* * * * *

UNITED STATES PATENT AND TRADEMARK OFFICE
CERTIFICATE OF CORRECTION

PATENT NO. : 6,280,177 B1
DATED : August 28, 2001
INVENTOR(S) : Walter Döbler

It is certified that error appears in the above-identified patent and that said Letters Patent is hereby corrected as shown below:

<u>Title page,</u>
Item [73], Assignee, "System Engineering Knauer GmbH & Co. KG" should read
-- Systec Engineering Knauer GmbH & Co. KG --.

Signed and Sealed this

Thirtieth Day of April, 2002

Attest:

Attesting Officer

JAMES E. ROGAN
*Director of the United States Patent and Trademark Office*